Sept. 27, 1960
D. O. BENSON
2,954,121
EXTRUSION OF SPIRALLY FORMED ARTICLE
Filed March 14, 1955
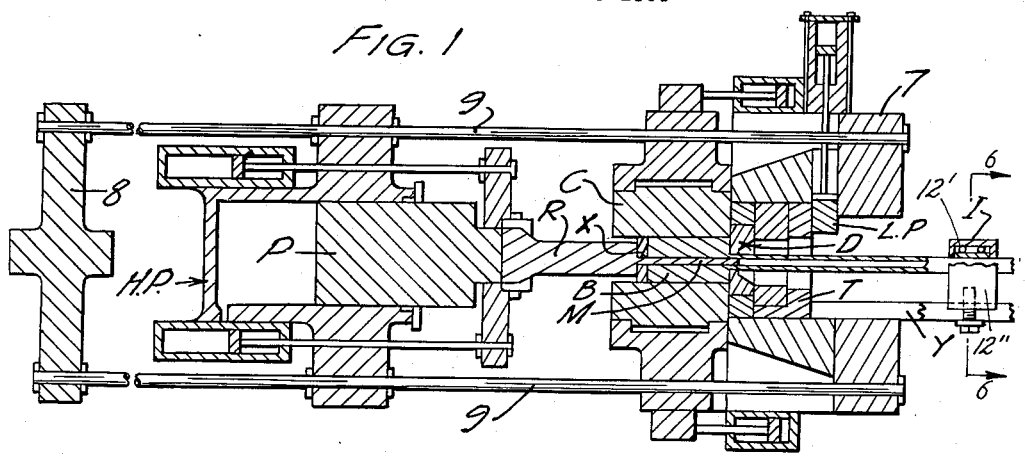
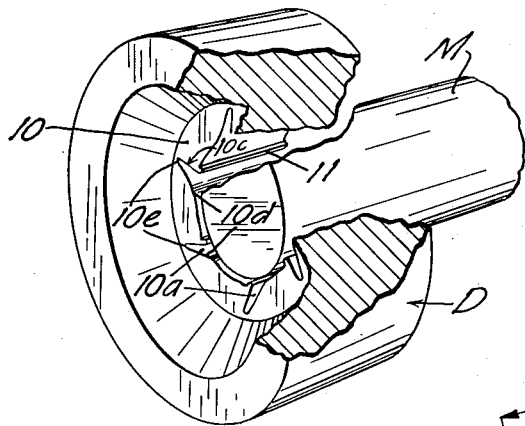
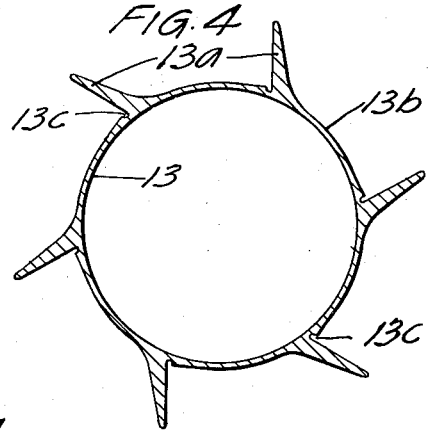
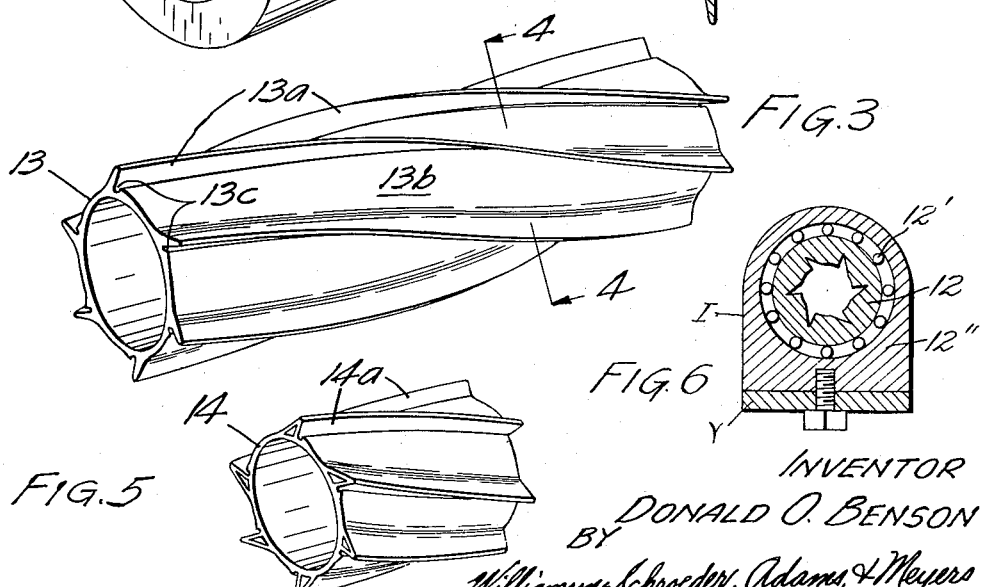
INVENTOR
DONALD O. BENSON
BY
Williamson, Schroeder, Adams, & Meyers
ATTORNEYS

United States Patent Office 2,954,121
Patented Sept. 27, 1960

2,954,121

EXTRUSION OF SPIRALLY FORMED ARTICLE

Donald O. Benson, 5105 14th Ave. S., Minneapolis, Minn.

Filed Mar. 14, 1955, Ser. No. 494,042

1 Claim. (Cl. 207—6)

This invention relates to the production of spirally formed articles of manufacture through extrusion of metal or equivalent extrudable materials, previously conditioned to soften and weaken the same.

My invention has particular reference to extrusion of metals and metal alloys for the production of articles having a series of spirally arranged, circumferentially spaced, protruding blades, vanes, wings or teeth and preferably, the production of such devices or stock which have a generally cylindrical or tubular hub or body.

The manufacture by extrusion of such products and stock makes possible very substantial economy as well as pitch uniformity in the production of many commercial articles and devices such as lawn mower reels, helical gear pinion stock, feeders and screw conveyors, rotors for snow plows and the like and parts or cores of numerous devices such as turbines, fans and the like which require spiral attachment and/or arrangement of blades, teeth or vanes.

It is an object of my present invention to provide a simple, highly efficient and commercial process together with efficient apparatus for producing through extrusion, a wide variety of articles of manufacture, parts, cores or stock having a series of spirally extending, circumferentially spaced, protruding blades, vanes, teeth or stages.

Another object is the provision of a process and apparatus of the class described, through the use of which devices, articles and parts having a generally cylindrical or a tubular core and body, may be economically and commercially produced with integrally formed spiral blades, vanes or teeth projecting therefrom.

Another object is the provision of articles of manufacture in the form of complete devices, parts or stock of the type having hubs or generally cylindrical bodies provided with a plurality of circumferentially spaced, spirally arranged blades, vanes or the like.

More specifically, it is an object to provide apparatus and processes of metal extrusion which through employment of novel "rifled" dies and closely cooperating elements and process steps, produce devices and articles of manufacture within a very wide range of use at substantial savings in labor, material, consumption and other items of cost, as contrasted with heretofore employed processes of manufacture.

These and other objects and advantages of my invention will more fully appear from the following description made in connection with the accompanying drawings, wherein like reference characters refer to similar parts throughout the several views and in which:

Fig. 1 is a somewhat diagrammatical, vertical section taken through a suitable type of extrusion press with my invention applied thereto for production of articles, stock or cores having a substantially cylindrical body or hub with a series of protruding, circumferentially spaced blades, flutings or wings integrally formed therewith;

Fig. 2 is a perspective view with portions broken away showing an embodiment of my spiral extrusion die prior to being locked into the front platen of an extrusion press and also showing a portion of a mandrel utilized for hollow spiral extrusions;

Fig. 3 is a perspective view showing a portion of an extrusion or stock embodying my invention and produced from my novel process and apparatus;

Fig. 4 is a cross section taken on the line 4—4 of Fig. 3;

Fig. 5 is a perspective view showing another embodiment of an article of manufacture of my invention wherein the blades or vanes as well as the hub, are hollow to accomplish saving in the weight of the extrusion material utilized, and Fig. 6 is a sectional view taken along line 6—6 of Fig. 1.

Referring now to Fig. 1, it will be understood that the type of extrusion press illustrated is merely exemplary of a wide variety of extrusion machines which may be employed in carrying out my novel and improved processes and as a part of my improved apparatus.

The press illustrated comprises a front platen 7, a rear platen or press head 8, said platens being rigidly interconnected by a series of circumferentially spaced press columns 9. The hydraulic press proper, indicated as an entirety by the letters HP, is mounted intermediately on press columns 9 and has its heavy piston P connected at the forward end with a ram R concentrically disposed thereof, which ram for the hollow extrusion of my invention, rigidly carries at its forward end, an elongated, axial mandrel M for projection through a hollow billet B to produce and mold the interior of a hollow extrusion.

The cylinder C of the press has affixed to the forward end thereof, my novel extrusion die or dies indicated in entirety by the letter D (later to be described in detail), which are properly held in place within the tool container T and the tool container and dies are locked in proper operative position within the bore of the front platen by a hydraulically operated lock plate L.P. A dummy block X is mounted at the forward end of ram R closely fitting in contour, the interior of the cylinder C and abuts the rear end of the preheated, hollow billet B acting as the immediate extrusion piston in the operation of the press.

In Fig. 1 and more in detail in Fig. 2, tools for carrying out an embodiment of my process and apparatus are illustrated including an annular die body 10 removably affixed to tool container T having formed in the interior or extrusion portion thereof, a plurality of circumferentially spaced "rifled" channels 10a spirally and longitudinally extending throughout the short length of the die body 10. In the embodiment of the die illustrated in Fig. 2, the channels or riflings 10a are defined along substantially straight cross sectional side surfaces 10c which extend at angles slightly less than perpendicular from the cylindrical, general inner contour of die body 10 with opposed, gradually curved channel sides 10d in cross section, curving and merging into the cylindrical contour of the inner periphery of die body 10. The channels 10a diminish or taper in cross sectional width from their open or inner portions thereof to the channel extremities 10e which terminate some distance inwardly of the outer periphery of the annular die body 10. It further will be noted that in the embodiment of die illustrated in Fig. 2, narrow, spirally arranged rib portions 11 are formed between the respective channels 10a, each rib 11 being immediately adjacent one of the cross sectional, straight sides of the channel to form in the produced extrusion, inwardly extending seats for receiving such elements as a blade or plate. My tools, as shown in the embodiment of Fig. 2, include the mandrel M previously referred to, which is secured to the forward end of the ram of the press and is related to the die body 10, as shown in Fig. 2, to move with the ram in close, spaced relation to the inner periphery of the stationary die body 10, thus producing a tubular, generally hollow extrusion in the particular embodiment illustrated in Fig. 2.

Certain embodiments of my apparatus preferably employ in combinative relationship with the extrusion press and rifled die member, an extrusion indexing mechanism indicated in entirety by the letter I (see Fig. 1) which as shown, may be slidably and adjustably fixed to a horizontal run-out table Y at the forward end of the press and which as illustrated, is provided with an extrusion-receiver 12 apertured, channeled or rifled to precisely fit the cross section of the extrusion. The extrusion-receiver 12 in the form shown in Fig. 1, is non-frictionally journaled, such as by ball-bearings 12' in the housing 12" of index mechanism I.

In some applications and embodiments of my apparatus, the extrusion-receiver 12 may be powered by a motor or rotary power source to rotate or turn in synchronism to the twisting or turning of the material extruded from the forward end of the annular die 10.

Where the extrusion process is vertically mounted with the axis of die 10 vertically disposed, indexing mechanism or extrusion-receivers in many instances, are not necessary.

Another concept of my process and apparatus is the provision of a shorter, channeled die member, contoured to produce either slightly spiraled or substantially straight line, fluted extrusions at the discharge of the die in combination with an extrusion receiver which is moved longitudinally on the platform or run-out table synchronized with the speed of extrusion of the material and furthermore, turned at a predetermined speed in one direction to primarily produce through such turning, the spiral configuration of the flutings on the extrusion.

Operation and products produced

While it will be understood I am not restricted to the use of a preformed billet B as the source of my extrudable metal or alloy, I prefer to employ a preformed, hollow billet B of tubular form, as shown previously before insertion in the press, being heated to a temperature to materially weaken and soften the strength of the material to the extent where under high piston pressure, the billet may be formed, molded and extruded by being forced longitudinally through the mold passages and apertures of the die. In certain of the desirable aluminum alloys, very suitable for production in my process, a temperature of between 800 and 850 degrees Fahrenheit of the billet is desirable at the time it is inserted into the cylinder C. In the embodiment shown, a rather thin, tubular, general extrusion is produced through the cooperation of the elongated mandrel M affixed axially to the front end of the ram.

The very high pressure developed by the powerful hydraulic press in extrusion of the billet raises the temperature often by 50 degrees centigrade on the heated billet to the ultimate extent desirable for extrusion of the particular material utilized.

In the longitudinal ejection of the softened, metallic material, the rifled channels 10a produce a general axial turning of the extruded billet with the resultant formation as shown in Fig. 3, of the circumferentially spaced, longitudinally and spirally extending ribs or blades 13a projecting from the body 13b of the extrusion identified as an entirety by the numeral 13. The simultaneous, longitudinal projection of the mandrel M in the form illustrated in Fig. 2, molds and forms the hollow interior of the generally tubular extrusion. The ribs 11 of the rifled, annular die body 10 produce shallow grooves or sockets 13c in the extrusion extending longitudinally adjacent the cross sectional, straight line sides of the blades or vanes 13a.

Fig. 3 shows a portion of the total length of a stock extrusion as previously described, produced by the particular embodiment of the apparatus invention and my process as carried out with the particular tools and die as illustrated in Fig. 2. It will be noted that the blades of spiral configuration are all integrally formed and structurally reinforced and strong. It will further be noted with this particular embodiment of my process, a relatively thin but nevertheless durable, tubular extrusion is produced materially economizing on the weight of the metallic extrudable material supplied. It of course will be understood that the relatively long extruded stock produced may be sectionally cut throughout its length to provide a multiplicity of finished articles of manufacture.

In Fig. 5, another embodiment of my improved extruded article of manufacture is illustrated where even further economy in the stock of metallic material employed, is achieved. In this instance, the extrusion 14 is characterized by a plurality (as shown, 6) of hollow, circumferentially spaced, spiralled blades 14a. To produce the hollow blades 14a, core-producing, substantially triangular die elements are required, set in by articulations or other means in the channels 10a of the die, or a special mandrel carrying the required number of circumferentially spaced core elements, is needed.

Such concept apparatus and additional steps are all within the scope of my invention.

Similarly, my process and apparatus is often utilized to produce extrusions of solid (not tubular) form, but having substantially cylindrical hub or body portions and a plurality of integrally formed, outwardly protruding, spiral blades, or teeth.

From the foregoing description, it will be seen that I have provided a comparatively simple but highly efficient method for successfully and commercially producing a very wide range of spiral extrusions of the class described, together with novel and improved apparatus for carrying out such process or processes.

It will further be seen that I have provided new articles of manufacture in the form of extrusions which have very wide applicability for many purposes and which may be manufactured at material savings in labor and materials utilized.

It will of course be understood that numerous changes may be made in the form, details, arrangement of parts and sequence of process steps as well as in the articles produced, all within the scope of my invention.

In the appended claim, the term "blades" is used in its broad sense to include wings, teeth or runs protruding from the body of the article.

What I claim is:

Apparatus for manufacturing by extrusion metal articles such as multi-bladed lawn mower reels having a hub in the form of a hollow open-ended but otherwise imperforate cylinder and a multiplicity of circumferentially spaced, gently spiralled blades integral therewith, said apparatus including a plunger-actuated extrusion press and having in combination a generally annular extrusion die provided with an enlarged axial opening and a multiplicity of communicating, circumferentially spaced, spiral die channels tapered outwardly in cross sectional shape and extending in depth in slightly inclined relation to the radii from said axial opening in the direction of spiraling, said die being disposed with its axis horizontally, a core mandrel disposed axially and generally within the said annular die and in spaced relation to the inner periphery of said die, and an extrusion-supporting means including a body means and an extrusion-receiving member, said extrusion-receiving member having an axial opening and communicating die channels similar to those in said die for receiving the article extruded from the die, said extrusion-receiving member being rotatably mounted in said body means, said body means being rigidly supported in position with respect to said extrusion die.

(References on following page)

References Cited in the file of this patent

UNITED STATES PATENTS

| | | |
|---|---|---|
| 1,902,975 | Sparks | Mar. 28, 1933 |
| 2,108,004 | Rogers | Feb. 8, 1938 |
| 2,154,611 | Friden | Apr. 18, 1939 |
| 2,217,194 | Bryce et al. | Oct. 8, 1940 |
| 2,388,558 | Loewy | Nov. 6, 1945 |
| 2,422,794 | Taylor | June 24, 1947 |
| 2,461,640 | Hallberg | Feb. 15, 1949 |
| 2,559,523 | Templin | July 3, 1951 |
| 2,680,902 | Amico | June 11, 1954 |
| 2,707,820 | Reynolds | May 10, 1955 |
| 2,751,076 | Lombard | June 19, 1956 |
| 2,865,502 | Anscher | Dec. 23, 1958 |

FOREIGN PATENTS

| | | |
|---|---|---|
| 224,576 | Germany | Feb. 3, 1912 |
| 881,486 | France | Jan. 28, 1943 |
| 954,729 | France | June 13, 1949 |

OTHER REFERENCES

"Extrusion of Aluminum Parts for Douglas Aircraft," pp. 139–147 of Machinery for July, 1945.

UNITED STATES PATENT OFFICE
CERTIFICATION OF CORRECTION

Patent No. 2,954,121            September 27, 1960

Donald O. Benson

It is hereby certified that error appears in the above numbered patent requiring correction and that the said Letters Patent should read as corrected below.

In the grant, lines 1, 2, and 3, for "Donald O. Benson, of Minneapolis, Minesota," read -- Donald O. Benson, of Minneapolis, Minnesota, assignor to Toro Manufacturing Corporation of Minnesota, of Minneapolis, Minnesota, a corporation of Minnesota, --; line 12, for "Donald O. Benson, his heirs" read -- Toro Manufacturing Corporation of Minnesota, its successors --; in the heading to the printed specification, lines 3 and 4, for "Donald O. Benson, 5105 14th Ave. S., Minneapolis, Minn." read -- Donald O. Benson, Minneapolis, Minn., assignor to Toro Manufacturing Corporation of Minnesota, Minneapolis, Minn., a corporation of Minnesota --.

Signed and sealed this 18th day of April 1961.

(SEAL)
Attest:

ERNEST W. SWIDER
Attesting Officer

DAVID L. LADD
Commissioner of Patents